(12) United States Patent
Wagner et al.

(10) Patent No.: US 7,846,871 B2
(45) Date of Patent: Dec. 7, 2010

(54) HEAT-SENSITIVE RECORDING MEDIUM AND USE THEREOF

(75) Inventors: Wolfgang Wagner, Flensburg (DE); Nebojsa Curcic, Wuppertal (DE)

(73) Assignee: Mitsubishi Hitec Paper Flensburg GmbH, Flensburg (DE)

( * ) Notice: Subject to any disclaimer, the term of this patent is extended or adjusted under 35 U.S.C. 154(b) by 1019 days.

(21) Appl. No.: 10/571,303

(22) PCT Filed: Sep. 2, 2004

(86) PCT No.: PCT/EP2004/009807
§ 371 (c)(1),
(2), (4) Date: Nov. 3, 2006

(87) PCT Pub. No.: WO2005/023554
PCT Pub. Date: Mar. 17, 2005

(65) Prior Publication Data
US 2007/0129249 A1    Jun. 7, 2007

(30) Foreign Application Priority Data
Sep. 6, 2003    (DE) .............................. 103 41 168

(51) Int. Cl.
*B41M 5/42* (2006.01)
(52) U.S. Cl. ...................... 503/226; 427/150; 427/152; 503/200
(58) Field of Classification Search ...................... None
See application file for complete search history.

(56) References Cited

U.S. PATENT DOCUMENTS

| | | |
|---|---|---|
| 4,227,980 A | 10/1980 | Pregitzer et al. |
| 4,485,123 A | 11/1984 | Troue |
| 4,722,966 A | 2/1988 | Flakus |

(Continued)

FOREIGN PATENT DOCUMENTS

DE    201 17 479    4/2003

(Continued)

*Primary Examiner*—Bruce H Hess
(74) *Attorney, Agent, or Firm*—Cohen Pontani Lieberman & Pavane LLP

(57) ABSTRACT

A heat-sensitive recording medium is presented, comprising
  a substrate (2) with a first side and a second side remote therefrom
  a heat-sensitive recording layer (4) which is placed on the first side of the substrate (2) and comprises at least one colorant precursor and colour acceptor, the colorant precursor and colour acceptor reacting with one another under the influence of heat to form a colour,
  a printed protective layer (9) which covers the recording layer (4), is crosslinkable and crosslinked under the influence of energy-rich radiation and is based on (meth)acrylates,
characterised in that
  the protective layer (9) contains
    from 65 to 95% by weight of one or more (meth)acrylates, selected from the group comprising polyether (meth)acrylate, epoxy(meth)acrylate and urethane (meth)acrylate
    from 0 to 20% by weight of photoinitiators and
    from 0.5 to 20% by weight of wax,
  at least one (meth)acrylate from the aforementioned group being an amine-modified (meth)acrylate and the percentages by weight adding up to form from 65.5 to 100% by weight of the layer (9),
  the protective layer (9) is printed on from a non-aqueous phase,
  at least one pigmented print layer (5,6) is applied between the recording layer (4) and the protective layer (9) and/or, in the case of a multi-ply protective layer (9), between the at least two plies of the protective layer (9).

13 Claims, 1 Drawing Sheet

(1)

Figure 1:
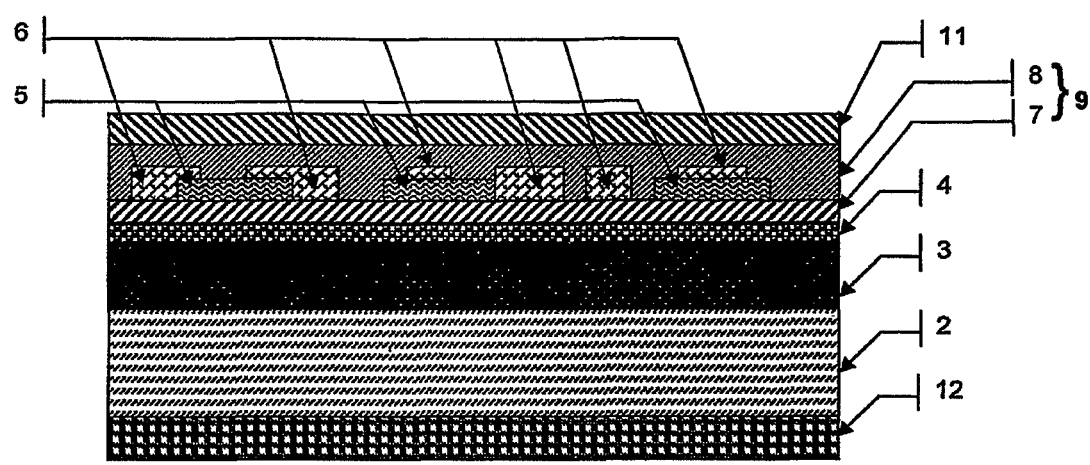

U.S. PATENT DOCUMENTS 6,177,144 B1 * 1/2001 Kranig et al. ............... 427/519

FOREIGN PATENT DOCUMENTS

| | | | |
|---|---|---|---|
| EP | 0 209 684 | | 1/1987 |
| EP | 0 264 827 | | 4/1988 |
| EP | 0 339 670 | * | 4/1989 |
| EP | 339 670 | | 11/1989 |
| EP | 0 747 871 | | 12/1996 |
| EP | 0 832 757 | * | 4/1998 |
| JP | 60-54842 | | 3/1985 |
| JP | 6-166264 | | 6/1994 |
| JP | 8-175007 | | 7/1996 |
| JP | 10-166734 | | 6/1998 |
| JP | 2000-233577 | | 8/2000 |
| JP | 2001-66993 | | 3/2001 |
| JP | 2002-307833 | | 10/2002 |
| WO | WO 85 04842 | | 11/1985 |
| WO | WO 93 25393 | | 12/1993 |
| WO | WO 99 42298 | | 8/1999 |
| WO | WO 02 081576 | | 10/2002 |

* cited by examiner

HEAT-SENSITIVE RECORDING MEDIUM AND USE THEREOF

The invention relates to a heat-sensitive recording medium comprising a substrate provided on one side with a heat-sensitive recording layer comprising at least one colorant precursor and at least one colour acceptor which react with one another under the influence of heat to form a colour. The recording layer is covered with a printed on protective layer which is crosslinked under the influence of energy-rich radiation and is based on (meth)acrylates. The invention similarly relates to the use of the proposed heat-sensitive recording medium as a label and to a composition which may be printed onto a heat-sensitive recording layer to form a protective layer.

EP 0 832 757 B1 discloses a generic recording medium in which the recording layer of a reversible heat-sensitive recording medium preferably receives a covering layer which, in addition to photoinitiators and wax as the main components, also comprises polymeric material which can be cured by electron or UV rays. A large number of organic unsaturated compounds, including acrylates such as dipentaerythritol pentacrylate, are disclosed therein as possible media, without an evaluation of their actual suitability. The application thereof to the already formed recording layer by offset printing is mentioned by way of example. The document does not provide a description of this method of application, which is merely disclosed marginally and not related to the remainder of the document, nor does it provide repeatable teaching concerning the quantitative composition of the protective layer. The protective layer can sometimes also contain silicone compounds, though the formation of the protective layer as a release layer and the method of application of a separate release layer above the protective layer are not suggested.

The use of a heat-sensitive recording medium with a layer carrier, a heat-sensitive recording layer which is applied to the front and a protective layer, which covers the recording layer, is cured by actinic radiation and is free from silicone-containing components, is known from WO 99/42298 A1 as the prior art. The layer carrier proposed therein carries a self-adhesive layer on the back. If the known heat-sensitive recording medium is rolled up, the self-adhesive layer and cured protective layer come into direct contact. The cured protective layer of the known heat-sensitive recording medium prevents adhesion of the individual plies within the roll, without the need to use a release paper. At the same time, the protective layer of the heat-sensitive recording medium which has been successfully used for years is suitable for offset printing. This document does not give any indication of the methods used to apply the protective layer.

According to a proposal in WO 93/25393 A1, a UV-protecting primer layer is applied to the recording layer of a heat-sensitive recording medium, optionally by flexographic printing, and conventionally dried by the supply of heat. This first primer layer is followed by a further coating which is crosslinked by radiation. Print may optionally be applied below the primer layer or the further coating. However, the document does not disclose an application of the further coating applied to the primer layer within a printing process.

EP 0 339 670 A2 also discloses a heat-sensitive recording medium having an intermediate layer containing a water-soluble or water-dispersible resin as the main component and a protective layer thereon formed on its recording layer. The protective layer contains a resin, which may be cured by electron beams, and a macromonomer with a molecule chain, of which the main component is organopolysiloxane and which comprises a polymerisable functional group at one end. The heat-sensitive recording medium which is known from that document and can also have a self-adhesive layer on the back should have better resistance to finger prints and solvents, so a reduction in the recording density or background greyness which would be observed without the protective layer, in already developed printed images on exposure of the recording layer with finger prints and solvents can be prevented. Although the intermediate layer according to the disclosure is conventionally coated and conventionally dried and also radiation cured, the document does not refer to application of the protective layer by printing processes.

Finally, EP 0 747 871 A2 discloses a label with a recording layer, which is applied to the front and is selectively pressure- or heat-sensitive, a base layer covering it and a release material which is applied to the base layer and contains silicone- and acrylate-based polymers. According to the object, this label does not require a separate release paper covering the self-adhesive layer applied to the back in order to be wound into the roll. Although the recording layer can be printed, the document does not indicate that the application of the base layer and of the release material can be carried out by a printing process. The document does not disclose a repeatable complete composition of the individual layers with all their fundamental components either.

Owing to the new applications which are constantly being found for heat-sensitive recording media, combined with the formation thereof in increasingly specific types, the number of different protective layers to be applied to the recording layers of these heat-sensitive recording media are also increasing. In terms of the process, this means that an ever-increasing number of different compositions have to be kept in reserve for producing protective layers within the production process, and can have the problem of being unsuitable for storage and becoming unserviceable after a relatively short time. In particular, different types mean long set-up times in the coating facilities, inter alia owing to complex washing processes for the processing units and the coating heads, and this can significantly reduce the flexibility and profitability of the production process. At the same time, the complex washing processes lead to environmental pollution through disposal of the waste water.

It can be inferred from all the documents evaluated hitherto that the heat-sensitive recording layer can be applied to a previously produced substrate using conventional coating units or, in one case, even using a printing unit. Conventional coating units such as doctor blades, roller blades, curtain coaters and spray coaters—where disclosed—are still used to apply the protective layers which follow the recording layers, application by printing not being excluded either. In this context, DE 201 17 479 U1 discloses a protective layer of UV-curable material containing acrylates or acrylic acid esters which also preferably comprises transparent fillers. Aqueous compositions for forming printing inks are also disclosed by WO 02/081 576 A1 and EP 0 209 684 B1. WO 85/04842 A1 discloses a recording medium with a sheet-form material as the substrate which carries, at least on one side, a heat-sensitive recording layer covered with an acrylic polymer varnish which can be cured under UV radiation. Sheets of plastics material are claimed and synthetic papers also disclosed as substrates. However, the combination of silicone-containing and silicone-free protective layers in any sequence, in particular for the formation of release layers, is not suggested in these documents.

In addition to the aforementioned increased flexibility, a further advantage of application of a protective layer to a heat-sensitive recording layer by printing is that the protective layer is produced in a first and/or second printing unit of a flexographic printing machine. The heat-sensitive recording medium can be finally printed in-line with colours and fabricated in the following printing units of the flexographic printing machine used in this way.

The heat-sensitive recording media currently known from the prior art and provided with a protective layer, which is also applied by printing, are not ideal in terms of printing. The often abrasive pigments in the print used to depict text and images jeopardise the thermal printing heads and, if the thermal printing heads are destroyed by excessively abrasive recording medium, can lead to costly warranty claims. Fluorescent pigments can be destroyed by the heat emitted by thermal printing heads, so they cannot be used unreservedly as authenticating security features on heat-sensitive recording media. Peeling of applied printed images would also be repeatedly observed in heat-sensitive recording media used as self-adhesive labels.

The printing inks conventionally used to form a protective layer are based on radically polymerisable olefinically unsaturated binders such as oligomers, prepolymers or polymers such as (meth)acrylofinctional (meth)acrylic polymers, epoxy resin (meth)acrylates, polyester(meth)acrylates, polyether (meth)acrylates, urethane (meth)acrylates, amine (meth)acrylates, unsaturated polyesters, unsaturated polyurethanes, silicone (meth)acrylates and combinations thereof. A drawback of these compositions is that they contain unsaturated monomers, for example vinylically or allylically unsaturated monomers, which are harmful to the environment and to health. Examples of such monomers include vinyltoluene, styrene and styrene derivative.

The use of reactive diluents during curing can generally lead to health problems owing to evaporation of the monomer compounds. Problems can also occur with the adhesion of the individual protective layers to the respective heat-sensitive recording layer, in particular when the reactive diluents are used in protective layers to be applied to heat-sensitive recording layers.

A first object of the present invention is therefore to provide a heat-sensitive recording medium comprising a heat-sensitive recording layer and a protective layer which is printed thereon and crosslinked under the influence of UV radiation and which allows processing of the protective layer by printing without health risks. The new recording medium is to exhibit good ply adhesion so as to avoid undesirable separation, in other words separation of the printed protective layer from the substrate with the recording layer. The new recording medium is also to allow improved protection of overprints, for example in the form of decorative, authenticating, or information-containing printed images, intended for the recording medium.

It is particularly desired with the present invention to provide a heat-sensitive recording medium comprising a printed-on protective layer which is crosslinked under the influence of UV radiation and with which otherwise conventional constituents, which have to be identified under the German hazardous materials directive, are completely dispensed with so the heat-sensitive recording medium is particularly suitable for contact and use in the food industry.

A second object of the present invention is to propose a composition for a protective layer which can be printed onto a heat-sensitive recording layer by the flexographic printing process and can be crosslinked under the influence of UV radiation, the composition being distinguished by excellent processing qualities, including good adhesion of the composition forming the protective layer to the heat-sensitive recording layer as well as processing of the composition by printing without health risks.

After intensive research, the inventors found that the first object can be achieved by a heat-sensitive recording medium comprising
  a substrate with a first side and a second side remote therefrom
  a heat-sensitive recording layer which is placed on the first side of the substrate and comprises at least one colorant precursor and colour acceptor, the colorant precursor and colour acceptor reacting with one another under the influence of heat to form a colour,
  a printed protective layer which covers the recording layer, is crosslinkable and crosslinked under the influence of energy-rich radiation and is based on (meth)acrylates, wherein
    the protective layer contains
    from 65 to 95% by weight of one or more (meth)acrylates, selected from the group comprising polyether (meth)acrylate, epoxy(meth)acrylate and urethane (meth)acrylate
    from 0 to 20% by weight of photoinitiators and
    from 0.5 to 20% by weight of wax,
  at least one (meth)acrylate from the aforementioned group being an amine-modified (meth)acrylate and the percentages by weight adding up to form from 65.5 to 100% by weight of the layer,
    the protective layer is printed from a non-aqueous phase,
    at least one pigmented print layer is applied between the recording layer and the protective layer and/or, in the case of a multi-ply protective layer, between the at least two plies of the protective layer.

The protective layer can be crosslinked, in particular by UV and electron radiation, UV radiation being particularly preferred. In this case, the protective layer contains photoinitiators in a range of 2 to 20% by weight and the percentages by weight of the one or more (meth)acrylates, photoinitiators and wax adding up to form from 67.5 to 100% by weight of the protective layer.

The protective layer is preferably printed by analog printing. Analog printing according to this invention denotes any printing processes which employ a printing plate or cylinder, including gravure printing, screen printing, offset printing and, in a particularly preferred embodiment, flexographic printing.

For fulfilling the second object there is proposed a non-aqueous composition for a protective layer which may be printed onto a heat-sensitive recording layer and may be crosslinked by energy-rich radiation, which contains
  from 65 to 95% by weight of one or more (meth)acrylates, selected from the group comprising polyether(meth)acrylate, epoxy(meth)acrylate and urethane(meth)acrylate
  from 0 to 20% by weight of photoinitiators and
  from 0.5 to 20% by weight of wax, at least one (meth)acrylate from the aforementioned group being an amine-modified (meth)acrylate and the percentages by weight adding up to form from 65.5 to 100% by weight of the composition. The proposed non-aqueous composition for achieving the second object should therefore be identical to the composition for forming the protective layer for a heat-sensitive recording medium which has already been proposed above in a first embodiment for achieving the first object.

The composition is preferably adapted to be printed by analog printing. UV and electron radiation can be used in particular for crosslinking the composition which can be printed as the protective layer onto a heat-sensitive recording layer, UV radiation being particularly preferred. In this case, the composition contains photoinitiators in a range of from 2 to 20% by weight and the percentages by weight of the one or more (meth)acrylates photoinitiators and wax add up to form from 67.5 to 100% by weight of the protective layer.

The composition according to the invention for the protective layer is virtually free from monomers and reactive diluents and has a low residual (meth)acrylic acid content. A flexographic printing unit is provided, for example within a flexographic printing machine, for applying the composition. The subsequent crosslinking is carried out under UV irradiation.

Examples of (meth)acrylates according to the proposed protective layer or composition for the protective layer include dipentaerythritol penta(meth)acrylate and can be found, for example, in the literature references U.S. Pat. No. 4,485,123 and EP 0 209 684 A1. Amine-modified polyether acrylate is preferably used as the amine-modified (meth)acrylate.

Suitable photoinitiators include those which initiate curing or radical polymerisation by using UV radiation and absorb, for example, in the wavelength range of from 190 to 400 nm. Photoinitiators of this type include, for example, chlorine-containing photoinitiators, aromatic ketones, hydroxyalkyl phenones and phosphine oxides. Benzophenone derivatives, phenyl ketones and phenyol phosphenates are preferred photoinitiators.

Examples of suitable waxes include polyethylene waxes such as PTFE-modified polyethylene wax.

In a preferred embodiment, the protective layer consists of at least two application planes, of which the first application plane faces the recording layer while the second application layer is turned away from the recording layer. In one embodiment, at least this second application plane consists of a composition which comprises 65 to 95% by weight of one or more (meth)acrylates, selected from the group comprising polyether(meth)acrylate, epoxy(meth)acrylate and urethane(meth)acrylate from 2 to 20% by weight of photoinitiators and from 0.5 to 20% by weight of wax, at least one (meth)acrylate from the aforementioned group being an amine-modified (meth)acrylate and the percentages by weight adding up to form from 65.5 to 100% by weight of the composition. The first application plane of the protective layer oriented toward the recording layer can be applied using a conventional coating device selected from the group comprising size press, doctor blade, rolling blade, curtain and spray coaters. However, it is preferable to apply the first application plane of the protective layer by printing. According to the invention, the at least second application plane of the protective layer turned away from the recording layer is applied by a printing unit.

Preferably, the protective layer is applied in a mass per unit area in a range of from 0.5 to 4.5 $g/m^2$ in the embodiment with one application plane. In the case of two application planes, the mass per unit area of the entire protective coating preferably lies in a range of from 1.2 to 6 $g/m^2$ and, in particular, between 1.5 and 4 $g/m^2$.

Preferably, the protective layer is applied to the entire area of the heat-sensitive recording layer in the embodiment with one application plane and therefore covers it completely. If the protective layer is in the form of at least two application planes, at least one application plane of the protective layer preferably covers the heat-sensitive recording layer over its entire area. It is thus possible, in particular, to cover particularly sensitive or particularly markedly stressed regions of the heat-sensitive recording medium with at least two protective layer application planes. In particular it is proposed that only the regions provided with the pigmented print layer be covered with two protective layer application planes; the pigmented print layer can be applied directly to the recording layer in this case: the first application plane of the protective layer covers the regions provided with the pigmented print layer while the second application plane of the protective layer is applied over the entire area.

the first application plane of the protective layer be applied only to regions of the recording layer to which the regions of the pigmented print layer will subsequently be applied; the second application plane of the protective layer is formed over the entire area to completely cover the layers lying beneath it.

the first application plane of the protective layer be formed over its entire area for complete coverage of the recording layer lying therebelow for complete coverage of the recording layer lying therebelow; only the regions of the pigmented print layer applied thereto are covered by the second application plane of the protective layer.

Owing to the two last proposed variants, it is possible to provide, in the pigmented print layer, components which do not harmonise with the heat-sensitive recording layer and can possibly lead to discoloration or loss of colour in the heat-sensitive recording layer.

Application of the protective layer or application of an application plane of the protective layer is followed, optionally after a short evaporation phase, by irradiation with energy-rich radiation, preferably with UV radiation. Preferably UV radiation sources with emissions in the wavelength range of from 180 to 420 nm, in particular from 200 to 400 nm, are used as the radiation source. Examples of such UV radiation sources include optionally doped, high-pressure, medium-pressure and low-pressure mercury radiation emitters, gas discharge tubes such as low-pressure xenon lamps, UV lasers, UV spot lights such as UV-emitting diodes and black light tubes.

In one possible variation, the pigmented print layer contains fluorescent pigments as the authenticating security feature. These fluorescent pigments are protected from direct contact with the thermal printing head during the thermal printing process by the protective layer or at least one ply of the protective layer. Such contact might otherwise reduce or destroy the effect of the fluorescent pigments. Unrestricted use of the fluorescent pigments is possible only with the construction according to the invention of the recording medium proposed here.

In an alternative variation, the pigmented print layer contains coloured pigments such as iron oxide pigments, chromium oxide pigments, azo pigments, phtalocyanine pigments and/or white pigments such as titanium(di)oxide. Such pigments can be markedly abrasive and can permanently damage or destroy the thermal head if they make direct contact therewith. As the pigmented print layer is covered by the protective layer or at least one ply of the protective layer, the thermal printing head is kept away from the abrasive pigments, allowing unrestricted use thereof in the pigmented print layer.

In a further variation of the heat-sensitive recording medium proposed here, both a pigmented print layer with fluorescent pigments and a pigmented print layer with coloured pigments are proposed. The two pigmented print layers can both be applied directly to the recording layer and then be covered with at least one application plane of the protective layer;

be separated from one another and/or from the recording layer with an application plane of the protective layer and then be covered by at least one further application plane of the protective layer; in this case, the protective layer can also comprise three application planes; the first application plane is positioned between the recording layer and a first pigmented print layer, for example with the fluorescent pigments, the second application plane lies between the first pigmented print layer and second pigmented print layer, for example with the coloured pigments, and the third application plane of the protective layer covers the second pigmented print layer.

The formation of a protective layer, which covers the heat-sensitive recording layer and is optionally constructed in a plurality of plies, and of the at least one pigmented print layer increases the distance between the heat-sensitive recording layer and the thermal head of a thermal printer which produces the printed image. As the distance between the recording layer and the thermal head increases, the resolution inevitably deteriorates, the resolution behaving substantially inversely proportionally to the square of the distance between recording layer and thermal head. Against this background, particular importance is attached to a heat-sensitive recording layer which effectively counteracts this physical effect in that it guarantees optimised resolution and particularly good printing dynamics, on other words a rapid response even to a slight heating effect. The heat-sensitive recording layer can basically contain any known colour generators as well as colour acceptors which are adapted in particular thereto, in particular organic colour acceptors. However, colour generators are particularly preferably selected from the group of fluorine compounds and organic colour acceptors adapted in particular thereto selected from the group comprising 2,2 bis(4-hydroxyphenyl)-propanes,
4-[(4-(1-methylethoxy)phenyl)sulphonyl]phenols
4,4'-dihydroxy-diphenylsulphones,
N-(p-toluenesulphonyl)-N'-(3-p-toluenesulphonyl-oxy-phenyl)-ureas,
2,4'-dihydroxy-diphenylsulphones,
N-(2-hydroxyphenyl)-2-[(4-hydroxyphenyl)thio]acetamides, but without being restricted to the above-mentioned colour acceptors. An average particle size in a range from greater than 0.3 µm to at most 1 µm, in particular from 0.45 µm to 0.9 µm is recommended for the colour generators. The upper limits are determined by inadequate sensitivity and the lower limits by an otherwise excessive tendency of the heat-sensitive recording medium to turn grey.

Coating devices which are suitable for applying the heat-sensitive recording layer include, in particular, roller doctor units, blade doctor units, curtain coaters or air brushes. According to a preferred embodiment, the coating composition used to form the recording layer is aqueous. Subsequent drying of the coating composition can be carried out by microwave irradiation. A process in which heat is supplied, as with hot air floatation driers or also contact driers, is conventional and proven. A combination of the aforementioned drying processes is also conceivable. The mass per unit area of the heat-sensitive recording layer is preferably between 2 and 6 g/m$^2$ and more preferably between 2.3 and 5.8 g/m$^2$.

A pigmented intermediate layer positioned between the substrate and the heat-sensitive recording layer can also have a positive influence on the responsiveness of the recording layer to heat supplied by the thermal printing head, which is why such an intermediate layer is particularly preferred. If the intermediate layer contains, in addition to inorganic pigments, also organic so-called hollow pigments which have air in their interior and consequently form a good heat insulator, such an intermediate layer acts as a heat reflector that focuses the heat, which is emitted by the thermal head and penetrates the recording layer and, beforehand, the protective and print layers protecting it, onto the heat-sensitive recording layer. The resolution capacity of the heat-sensitive recording layer may thus also be increased in addition to its responsiveness.

The organic pigments of the intermediate layer comprise a wall of thermoplastic resin which preferably comprises (meth)acrylonitrile copolymer, polyvinyl chloride, polyvinylidene chloride, polystyrene, styrene acrylate, polyacrylonitrile or polyacrylic acid ester. Pigment mixtures of different organic pigments are conceivable.

The intermediate layer, which is deemed to be a preferred embodiment, can also contribute positively to the levelling of the substrate surface, so the amount of coating composition which has to be applied to the heat-sensitive recording layer is reduced. For this reason, levelling coating devices such as roller doctor units, doctor blade or roller doctor units can be used to apply the intermediate layer. If the intermediate layer contains oil-absorbing pigments as the inorganic pigments, they can absorb the wax components of the heat-sensitive recording layer which are liquefied by the heating effect of the thermal head, during formation of the typeface, and therefore promote even more reliable, fast implementation of heat-induced recording, which is particularly important on account of the energy-absorbing protective and print layers covering the recording layer—as already stated.

Inorganic pigments for the intermediate layer selected from the group comprising natural and calcined kaolin, silicon oxide, bentonite, calcium carbonate and aluminium oxide and, in this case in particular, boehmite have preferably been proven. Mixtures of a plurality of different inorganic pigments are also conceivable.

The quantitative ratio of organic to inorganic oil-absorbing pigment represents a compromise in the effects achieved by the two types of pigment, which is particularly advantageous if from 15 to 50% by weight, preferably from 25 to 40% by weight, of the pigment mixture consists of organic pigment and from 85 to 50% by weight, preferably from 75 to 60% by weight, of inorganic pigment.

The particle size, defined as the $D_{50}$ value, of the organic pigments present in the intermediate layer lies in a range of from 0.75 µm to less than 1.5 µm, preferably in a range of from 0.8 µm to 1.1 µm. Particle sizes of less than 0.75 µm are prohibited on account of rheological processing problems. Particle sizes greater than 1.5 µm exhibit excessively coarse-grain behaviour and prevent preferred levelling of the intermediate layer. The particle size of the inorganic pigments is ideally less than 2 µm, defined as the $D_{50}$ value. Pigments in which from 34 to 40% by weight of the particle size distribution is less than 1 µm and from 57 to 63% by weight is less than 2 µm have proven advantageous.

The mass per unit area of the pigmented intermediate layer is preferably between 5 and 20 g/m$^2$ and even more preferably between 6 and 10 g/m$^2$.

Although the invention is not restricted to paper as the substrate, paper and, in this case in particular, a coating base paper with an untreated surface is a substrate which has been successfully used in the market, is environmentally acceptable on account of its good recyclability, and is preferred according to the invention. A coating base paper with an untreated surface is understood to be a coating base paper which has not been treated in a size press or in a coating device. Sheets, for example, of polyolefin and polyolefin-coated papers are equally possible as the substrate for the invention, without this embodiment being limiting.

To enhance the quality of the product for the end consumer, heat-sensitive recording media and, in this case in particular, labels with gloss surfaces are increasingly demanded. The gloss preferably lies in the range of from 70 to 80%, measured to the parameters of ISO 8254, Part 1. Preferably, the recording medium according to the invention, particularly when intended for use as a label, is additionally provided with a gloss varnish which is printed onto the protective layer and has a gloss in the above-mentioned range of from 70 to 80% (ISO 8254, Part 1). In such a case, the optionally multi-ply protective layer and the at least one pigmented print layer are preferably formed in a flexographic printing machine, in the first printing units thereof, while the gloss varnish is also applied in the same operation—for example by the last printing unit of the flexographic printing machine.

In a particular embodiment, the heat-sensitive recording medium according to the invention is equipped with a (self) adhesive layer on the back, as a label. Depending on the requirements, the adhesive layer can be covered by a release material such as a silicone-containing release paper, or the outer protective or gloss layer of the recording medium according to the invention is provided with an additional release layer which is preferably printed on—ideally by flexographic printing. The release layer contains release agents based on silicone oil and/or silicone fat. Owing to the construction of the release layer, which seals the recording medium on its first side, with silicone oil and/or silicone fat, the proposed recording medium with a self-adhesive backing layer without release paper can be wound into a roll so that the self-adhesive layer and the release layer come into contact in the roll without permanent adhesion taking place.

In a particularly preferred embodiment, the release layer can be cured or crosslinked under the influence of energy-rich radiation such as UV or electron radiation. If the release layer is to be cured by UV beams, the monomers or prepolymers used to produce this layer have to contain additions of photoinitiators in a known manner. A release layer which is formed, i.e. cured, particularly uniformly over its cross section could be achieved by electron beam curing.

The present invention also claims the use of the proposed heat-sensitive recording medium as a label, in particular for identifying foods in general, chiller products and, in particular, deep frozen products. For this purpose, the recording medium according to the invention must be particularly resistant to the environment, in particular to water.

The details on mass per unit area given in the description and claims, of % by weight and parts by weight each relate to the absolute dry weight. The numerical details in the statements relating to the organic pigments of the pigmented intermediate layer are calculated from the air-dry weight, less the content by weight of water around and inside the pigments in the form as delivered.

The following example will illustrate the invention:

A paper web was produced on a Fourdrinier paper machine from bleached and ground hardwood and softwood pulp with a mass per unit area of 67 $g/m^2$ with addition of conventional additives in conventional amounts as the substrate. An intermediate layer having a mass of 8 $g/m^2$ and predominantly containing styrene butadiene latex as binder,
starch as co-binder and
a pigment mixture of an organic hollow pigment with a polystyrene wall and of calcined kaolin was applied to the front using a doctor blade.

A heat-sensitive recording layer having a mass per unit area of 4.5 $g/m^2$ and containing colour generators and colour acceptors as well as a print layer with azo pigments, representing a text after the drying thereof by the flexographic printing process, and a protective layer of 2 $g/m^2$ which was crosslinkable under UV radiation and covered the print layer located therebelow and the recording layer over its entire area were applied to the intermediate layer, which was conventionally dried by the supply of heat, in this sequence, using a roller doctor. A previously produced composition having the following formulation is used:

40% by weight of dipentaerythritol pentacrylate are mixed with 40% by weight of low-viscosity amine-modified polyether acrylate and a combination of 10% by weight of benzphenone derivative and 8.5% by weight of hydroxycyclohexylphenyl ketone with one another. 1.5% by weight of PTFE-modified polyethylene wax is added to this mixture and mixed homogeneously together. A composition which is free from reactive diluent and has a low residual acrylic acid content is obtained. After the application of pressure to the composition, the composition is crosslinked using UV spot lights.

The invention will be illustrated in further detail with reference to FIG. 1:

A claimed embodiment of the heat-sensitive recording medium (1) according to the invention provides a substrate (2) which consists of an uncoated paper in this case. The following are applied to one side of the substrate (2) in this order:

a pigmented intermediate layer (3) which covers the substrate (2) over its entire area and has been applied using a rolling doctor unit;

a heat-sensitive recording layer (4) which is applied over the entire area using a roller doctor unit;

a first application plane (7) of a protective layer (9) which covers the heat-sensitive recording layer (4) over its entire area and has been applied using a printing unit of a flexographic printing machine and has been cured by UV radiation;

a first pigmented print layer (5) which is applied using a flexographic printing machine and contains colourless fluorescent pigments, in this case for forming a security logo in the form of lettering;

a second pigmented print layer (6) applied using a flexographic printing machine and containing coloured pigments for forming a coloured information text, here in the form of a voucher to be cashed;

a second application plane (8) of the protective layer (9) which covers the previous print layers (5, 6) over their entire area, has been applied by a printing unit of a flexographic printing machine and has been crosslinked by UV radiation;

a release layer (11) with release agents based on silicone oil and silicone fat which covers over the entire area and has been applied using a printing unit of a flexographic printing machine and has been crosslinked by UV radiation.

A self-adhesive layer (12) is applied to a second side of the substrate (2), remote from the first side of the substrate (2).

The invention claimed is:

1. Heat-sensitive recording medium comprising:
   a substrate with a first side and a second side remote therefrom
   a heat-sensitive recording layer which is placed on the first side of the substrate and comprises at least one colorant precursor and colour acceptor, the colorant precursor and colour acceptor reacting with one another under the influence of heat to form a colour,
   a printed-on protective layer which covers the recording layer, is crosslinkable and crosslinked under the influence of energy-rich radiation and is based on (meth)acrylates,
   the protective layer contains
   from 65 to 95% by weight of one or more (meth)acrylates, selected from the group comprising polyether(meth)acrylate, epoxy(meth)acrylate and urethane(meth)acrylate
   from 0 to 20% by weight of photoinitiators and
   from 0.5 to 20% by weight of wax,
   at least one (meth)acrylate from the aforementioned group being an amine-modified (meth)acrylate and the percentages by weight adding up to form from 65.5 to 100% by weight of the layer,
   the protective layer is printed on from a non-aqueous phase,
   at least one pigmented print layer is applied between the recording layer and the protective layer or, in the case of a multi-ply protective layer, between the at least two plies of the protective layer, and
   the protective layer comprises at least a first application plane facing the recording layer and a second application plane turned away from the recording layer and at least partially overlapping the first application plane.

2. Heat-sensitive recording medium according to claim 1, wherein the energy-rich radiation for crosslinking the protective layer is UV radiation and the protective layer contains from 2 to 20% by weight of photoinitiators.

3. Heat-sensitive recording medium according to claim 1, wherein the protective layer is printed by analog printing.

4. Heat-sensitive recording medium according to claim 1, wherein at least one of the first and second application planes of the protective layer covers an entire area of the heat-sensitive recording layer.

5. Heat-sensitive recording medium according to claim 1, wherein a pigmented intermediate layer is formed between the substrate and the recording layer.

6. Heat-sensitive recording medium according to claim 1, wherein the at least one pigmented print layer contains colourless pigments, which are fluorescent under UV light, as the authenticating security feature.

7. Heat-sensitive recording medium according to claim 1, wherein the at least one pigmented print layer contains coloured pigments for reproducing information.

8. Heat-sensitive recording medium according to claim 1, wherein a high-gloss varnish is printed onto the protective layer.

9. Heat-sensitive recording medium according to claim 1, wherein a self-adhesive layer is applied to the second side of the substrate and a release layer is printed onto the protective layer.

10. Heat-sensitive recording medium according to claim 9, wherein the release layer is crosslinked under the influence of high energy radiation.

11. Heat-sensitive recording medium according to claim 9, wherein the release layer contains release agents based on at least one of silicone oil and silicone fat.

12. Heat-sensitive recording medium according to claim 1, wherein the heat-sensitive recording medium is as a label.

13. A method of making a heat-sensitive recording medium comprising:
   a substrate with a first side and a second side remote therefrom;
   a heat-sensitive recording layer which is placed on the first side of the substrate and comprises at least one colorant precursor and colour acceptor, the colorant precursor and colour acceptor reacting with one another under the influence of heat to form a colour,
   a printed-on protective layer which covers the recording layer, is crosslinkable and crosslinked under the influence of energy-rich radiation and is based on (meth)acrylates, the protective layer including
      from 65 to 95% by weight of one or more (meth)acrylates, selected from the group comprising polyether (meth)acrylate, epoxy(meth)acrylate and urethane (meth)acrylate
      from 0 to 20% by weight of photoinitiators and
      from 0.5 to 20% by weight of wax,
      at least one (meth)acrylate from the aforementioned group being an amine-modified (meth)acrylate and the percentages by weight adding up to form from 65.5 to 100% by weight of the layer,
   at least one pigmented print layer is applied between the recording layer and the protective layer or, in the case of a multi-ply protective layer, between the at least two plies of the protective layer, and
   the protective layer comprises at least a first application plane facing the recording layer and a second application plane turned away from the recording layer and at least partially overlapping the first application plane,
   the method comprising:
   placing the heat sensitive recording layer on the first side of the substrate;
   applying the at least one pigmented layer between the recording layer and the protective layer or, in the case of a multi-ply protective layer, between the at least two plies of the protective layer; and
   applying the protective layer, including printing the second application plane of the protective layer, wherein the second application plane of the protective layer is printed on from a non-aqueous phase.

* * * * *